United States Patent
Hawk et al.

(10) Patent No.: US 6,330,822 B1
(45) Date of Patent: *Dec. 18, 2001

(54) TIRE TESTING APPARATUS AND METHOD

(75) Inventors: Homer J. Hawk, Racine, WI (US); Thomas Setele, Parma; Craig Brookhart, Lakewood, both of OH (US)

(73) Assignee: MTD Products Inc, Cleveland, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,293

(22) Filed: Dec. 30, 1998

Related U.S. Application Data

(60) Provisional application No. 60/096,128, filed on Aug. 10, 1998.

(51) Int. Cl.[7] .................................................. G01M 3/04
(52) U.S. Cl. .................................. 73/40.7; 73/40; 73/49
(58) Field of Search .......................... 73/40, 40.7, 41, 73/41.2, 41.3, 45.1, 45.2, 45.3, 45.4, 45.5, 45.6, 49, 52

(56) References Cited

U.S. PATENT DOCUMENTS

| | | | |
|---|---|---|---|
| 3,632,701 | * | 1/1972 | Devitt et al. ............................ 264/40 |
| 3,721,117 | * | 3/1973 | Ford et al. ............................... 73/49 |
| 4,221,124 | * | 9/1980 | Jones ........................................ 73/40 |
| 5,150,605 | * | 9/1992 | Simpson ................................ 73/49.3 |
| 5,361,626 | * | 11/1994 | Colligan et al. ..................... 73/40.7 |
| 5,738,770 | * | 4/1998 | Strauss et al. .................. 204/298.12 |
| 5,850,036 | * | 12/1998 | Giromini et al. ....................... 73/40 |
| 5,889,199 | * | 3/1999 | Wong et al. ............................. 73/40 |
| 6,050,133 | * | 4/2000 | Achter et al. ........................ 73/40.7 |
| 6,202,477 | * | 3/2001 | Lehmann ............................... 73/49.3 |

* cited by examiner

*Primary Examiner*—Hezron Williams
*Assistant Examiner*—Michael Cygan
(74) *Attorney, Agent, or Firm*—Roger D. Emerson; Emerson & Skeriotis; Timothy D. Bennett

(57) ABSTRACT

A tire testing apparatus and method for detecting leaks in tires used on lawn mowers. The tire testing apparatus includes a vacuum chamber, a roughing pump, a hi-vac pump, an airtight seal, and a spectrometer. The roughing pump and hi-vac pump evacuate the air from the vacuum chamber, creating a vacuum. The pressure sensor detects the level of vacuum in the vacuum chamber and reports this information to the PLC. A method of detecting leaks in tires using the tire testing apparatus is also provided. The method includes the steps of inflating the tire with a mixture of air and 10% helium by volume, placing the tire in the vacuum chamber, sealing the vacuum chamber and removing the air creating a vacuum, then detecting the amount of helium in the chamber, and removing the tire from the chamber and placing it either in the rejected conveyor, or the acceptable conveyor.

9 Claims, 13 Drawing Sheets

TIRE TESTING APPARATUS AND METHOD

This application is a continuation-in-part application of a U.S. Provisional Patent Application Ser. No. 60/096,128, entitled "Tire Test Apparatus and Method", filed on Aug. 10, 1998. The Provisional Application, U.S. Ser. No. 60/096,128, is hereby incorporated by reference.

BACKGROUND OF THE INVENTION

1. Field of Invention

This invention pertains to the art of methods and apparatuses for leak detection, and more specifically to methods and apparatuses for leak detection on small pneumatic tires, such as those commonly used on riding lawn mowers.

2. Description of the Related Art

The need for detecting leaks in various pneumatic products is well known in the art. In order for a pneumatic tire to function properly, all components must be sealed so that the tire will not leak air and decrease in pressure. Several methods of leak detection exist, and have previously been used to detect leaks in various products. However, using a helium leak detector for detecting leaks in tires before the tires are placed onto a vehicle, is new in the art. Previously, the leaks in the tires were not found until the lawn mower had been assembled and purchased by the dealer or consumer. Once the lawn mower had reached the consumer, it was too late to conveniently repair or replace the leaking tire. In addition, the lawn mower manufacture could not easily determine whether the leak was a defect of the tire, as manufactured by the tire manufacturer, or whether the tire had been subsequently damaged. As a result, the lawn mower manufacturers could not require the tire suppliers to repair or credit the lawn mower manufacturer for the defective tires.

One current testing method involves inflating the tires and then storing them in a warehouse for 48 hours in order to allow leaking tires to decrease in pressure. The tires are then delivered to the assembly line where they are checked for proper inflation pressure before mounting the tire on a lawn mower. This method is capable of detecting gross leaks, a leak that is so large that the tire loses a significant amount of the inflation pressure. However, many tires have much smaller leaks that cannot be detected in this short period of time. These tires continue to leak while in storage and become flat by the time the mower reaches the customer. Another problem with this testing method is the amount of material handling and warehouse space required.

The present invention contemplates a new and improved tire testing apparatus and method. Thus, this invention is simple in design, effective in use, and overcomes the foregoing difficulties and others while providing better and more advantageous overall results.

SUMMARY OF THE INVENTION

In accordance with one aspect of the present invention a new and improved tire testing apparatus includes a robotic arm, a roughing pump, a high vacuum (hi-vac) pump, a spectrometer, first and second vacuum chambers, and a pressure sensor. The robotic arm has a set of pincer-like extensions for gripping the tires. The roughing pump and hi-vac pump create a vacuum in the vacuum chambers. The vacuum chambers have a cylindrical shape, a chamber top, and tubes connecting the vacuum chambers to the spectrometer and the respective pumps. The pressure sensor senses the level of vacuum created in the vacuum chambers by the roughing and hi-vac pumps.

In accordance with another aspect of the invention, the tire is filled with a mixture of air and 10% helium by volume. The tire is then placed in the vacuum chamber and the chamber is sealed with a chamber top and an o-ring. The air is removed from the vacuum chamber by the pumps, and a vacuum is created at around 5.0 millitorrs to 600 millitorrs. A spectrometer detects the level of helium in the vacuum chamber and measures that against the acceptable level, and tells the robotic arm to either place the tire in the rejected conveyor or the acceptable conveyor. The entire process takes about 13 seconds.

One advantage of the present invention is that the leaks in the tires can be detected before they are placed on the lawn mower and sent to the consumers.

Another advantage of the current invention is that the defective tires can be promptly identified and returned to the manufacturer of tires.

Yet another advantage of the current invention is that small leaks which would go unnoticed by previous testing methods, can now be detected before shipping.

Another advantage of the current invention is that the helium leak detection is an extremely sensitive means for detecting leaks.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts. A preferred embodiment of these parts will be described in detail in this specification and illustrated in the accompanying drawings, which form a part hereof and herein.

DESCRIPTION OF THE PREFERRED EMBODIMENT

Figure 1:
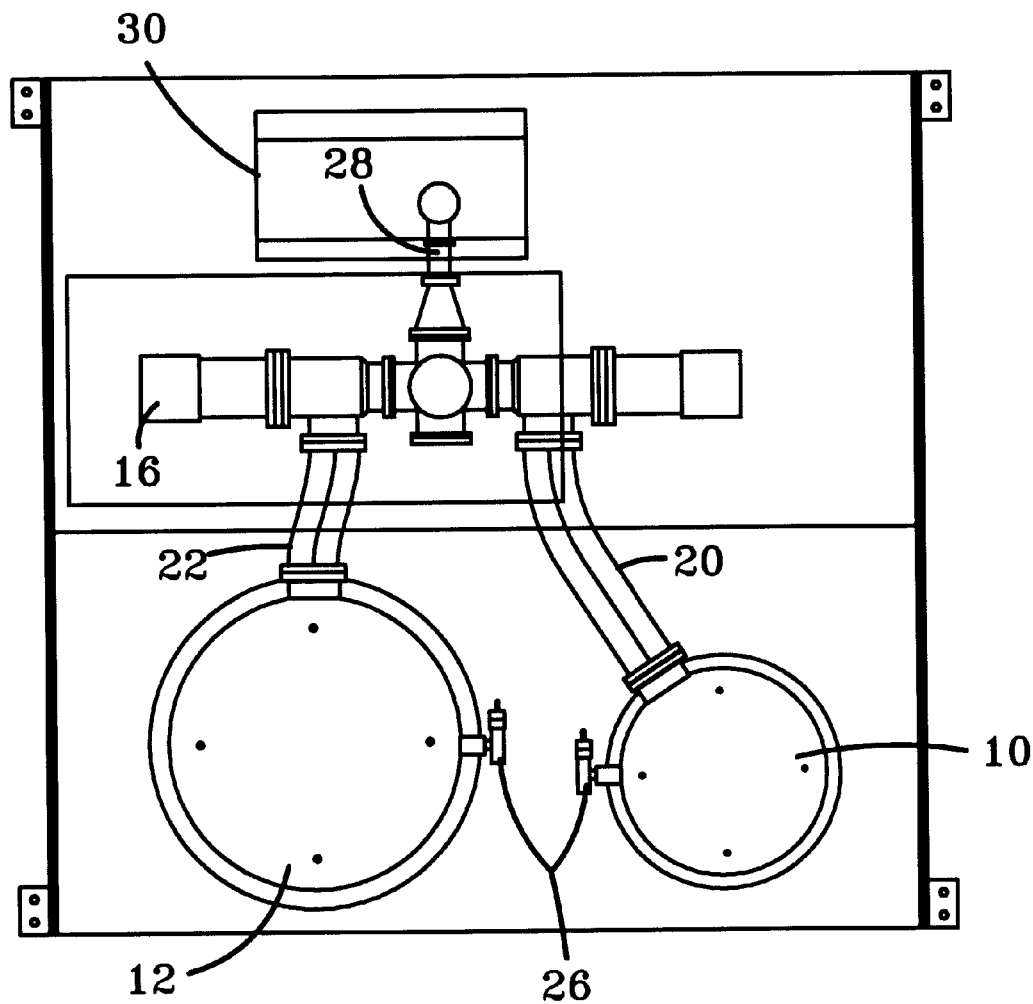
FIG. 1 is a top view of the tire testing apparatus showing the first and second vacuum chambers, the hi-vac pump, the pressure sensor, and the spectrometer.
Figure 2:
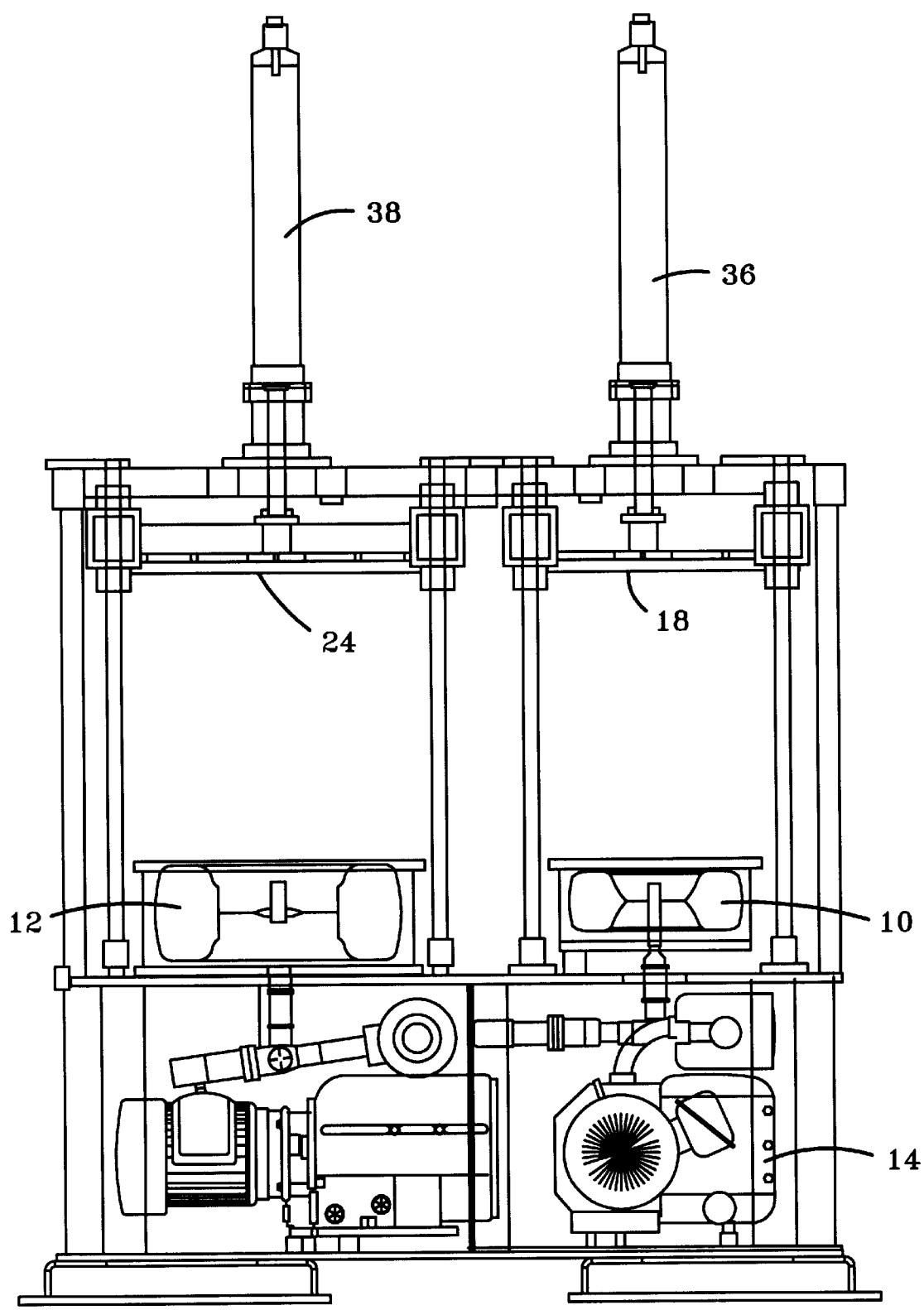
FIG. 2 is a perspective view of the tire testing apparatus, showing the first and second vacuum chambers, the roughing pump, the first and second chamber tops, the first and second air cylinders, and the o-ring flanges.
Figure 3:
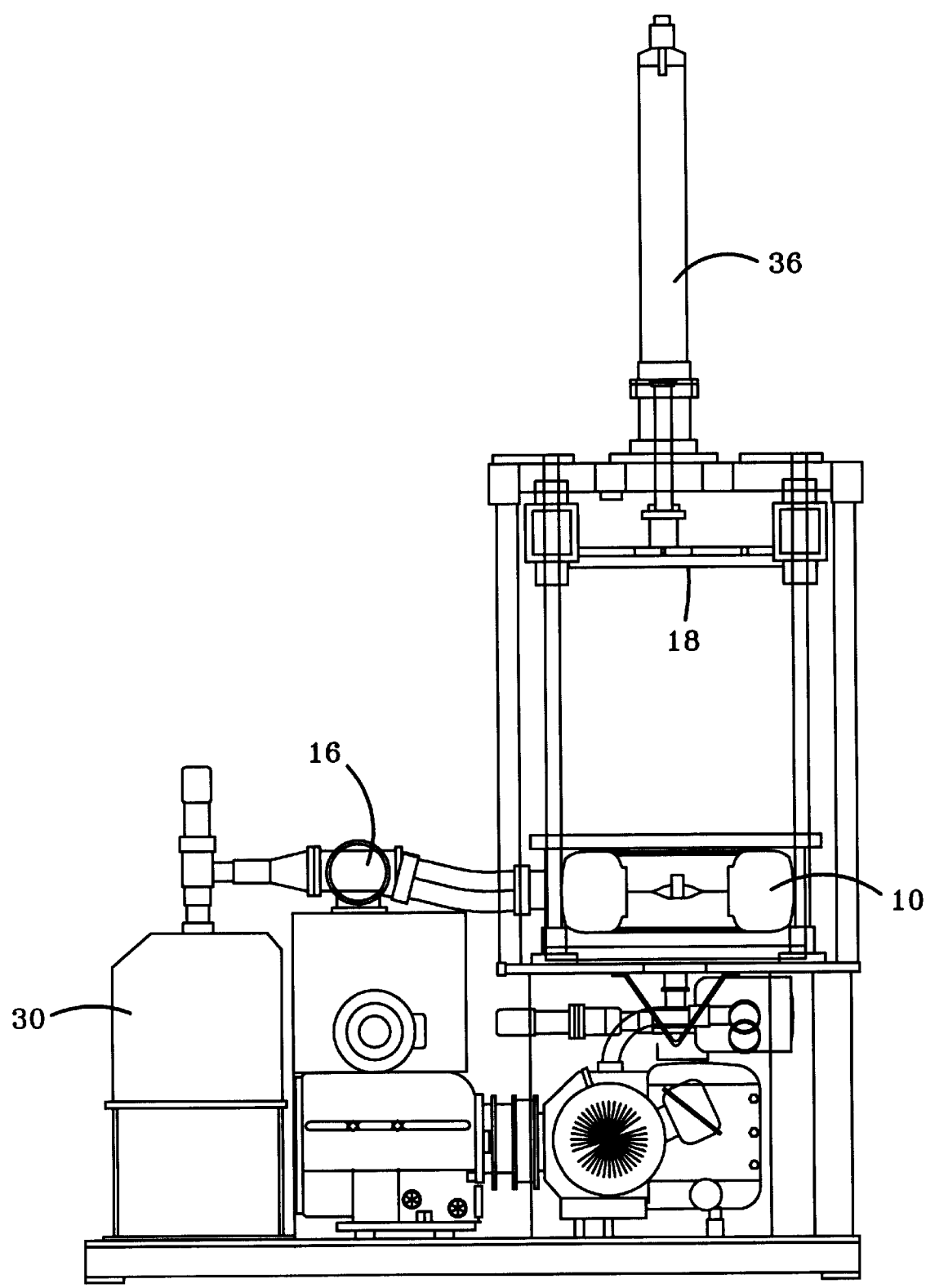
FIG. 3 is a perspective view of the tire testing apparatus showing the first vacuum chamber, the first chamber top, the first air cylinder, the spectrometer, and the hi-vac pump.
Figure 4:
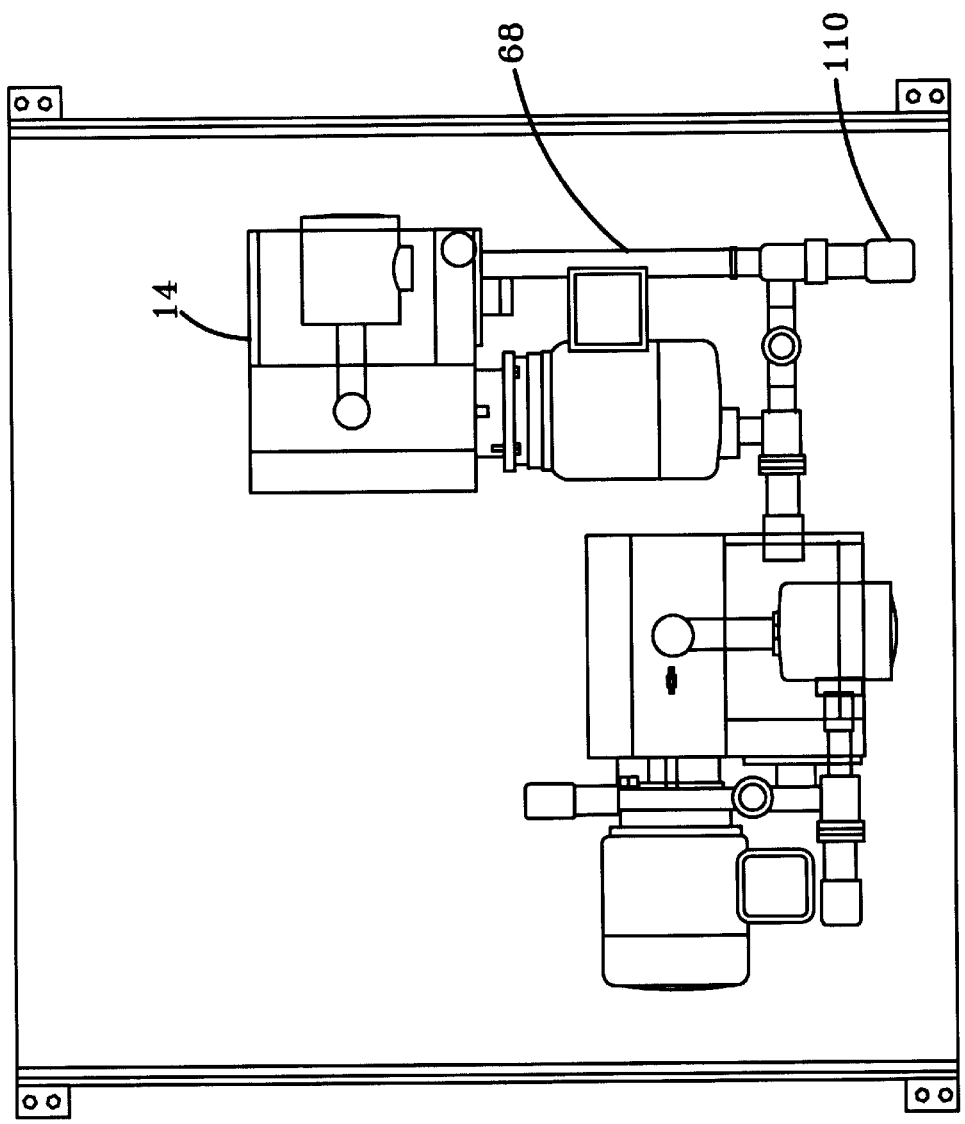
FIG. 4 is a top view of the roughing pump.
Figure 5:
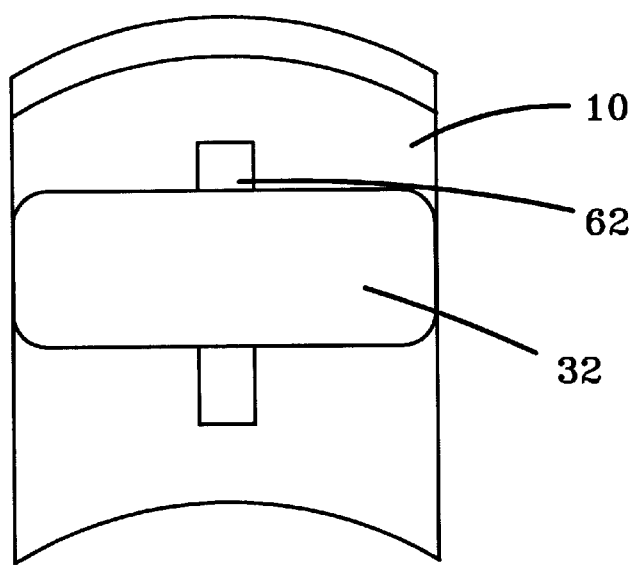
FIG. 5 is a cross sectional view of the first vacuum chamber, showing the tire assembly inside the first vacuum chamber.
Figure 6:
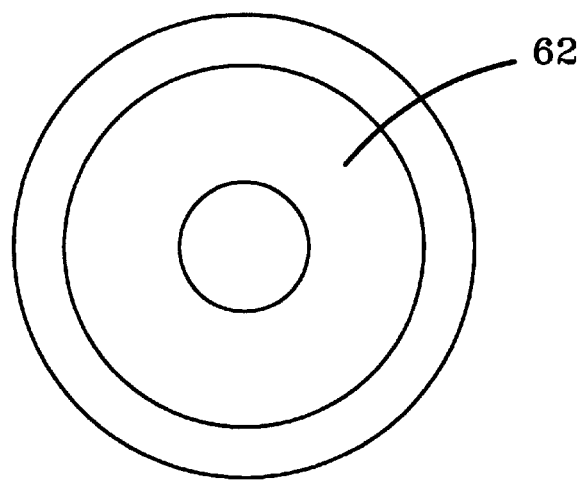
FIG. 6 is a perspective view of the tire rim.

Referring now to the drawings, which are for purposes of illustrating a preferred embodiment of the invention only, and not for purposes of limiting the same, FIG. 1 shows the tire testing apparatus that includes first and second vacuum chambers 10, 12, a hi-vac pump 16, a pressure sensor 26 and a spectrometer 30. Although FIGS. 1 and 2 show both a roughing pump 14 and a hi-vac pump 16, the invention would work with only one pump. The roughing pump 14 and the hi-vac pump 16 are connected to the first vacuum chamber 10 by a second tube 20. By "hi-vac pump" it is meant a pump which has a higher capacity to create a vacuum than the roughing pump 14. The two pumps 14, 16 are connected to the second vacuum chamber 12 by a third tube 22. Near the bottom of each vacuum chamber 10, 12 is a pressure sensor 26. The pressure sensor 26 detects the level of vacuum inside the vacuum chambers 10, 12 and provides feedback to the programmable logic controller (PLC)(not shown). This feedback is used to control the pumping and testing process.

Figure 7:
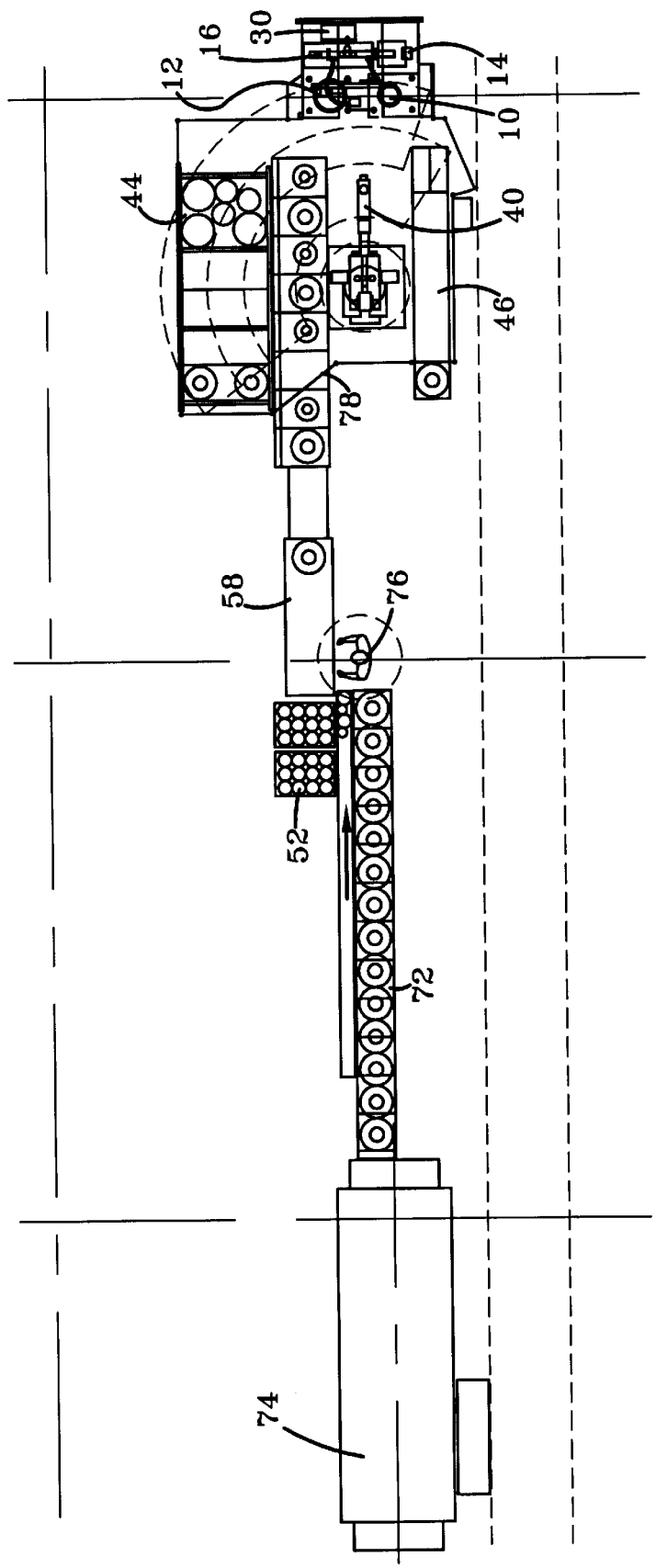
FIG. 7 is a perspective view of the entire tire assembly and test process, showing oven used for heating the tires, the conveyor leading to the tire inflater, the tire inflater, and the tire testing apparatus.
Figure 8:
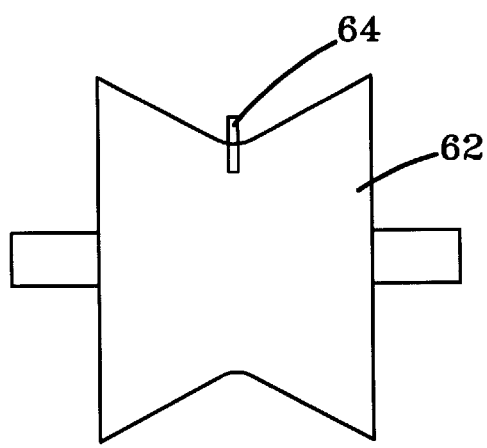
FIG. 8 is a perspective view of the tire rim, showing the valve stem.
Figure 9:
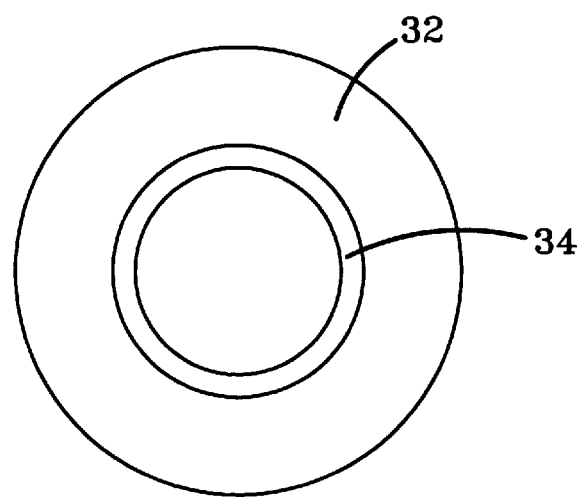
FIG. 9 is a perspective view of the tire showing the tire and the tire bead.
Figure 10:
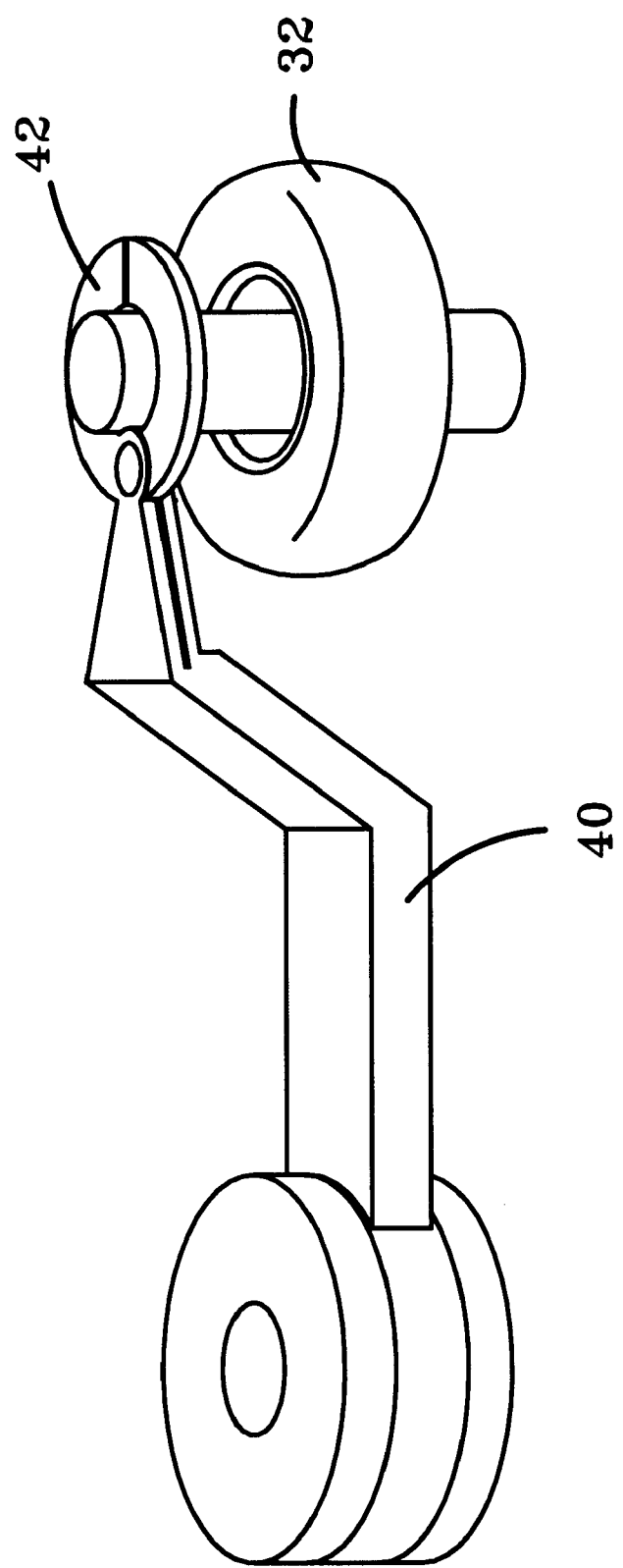
FIG. 10 is a perspective view of the robotic arm showing the pinchers holding a tire assembly.
Figure 11:
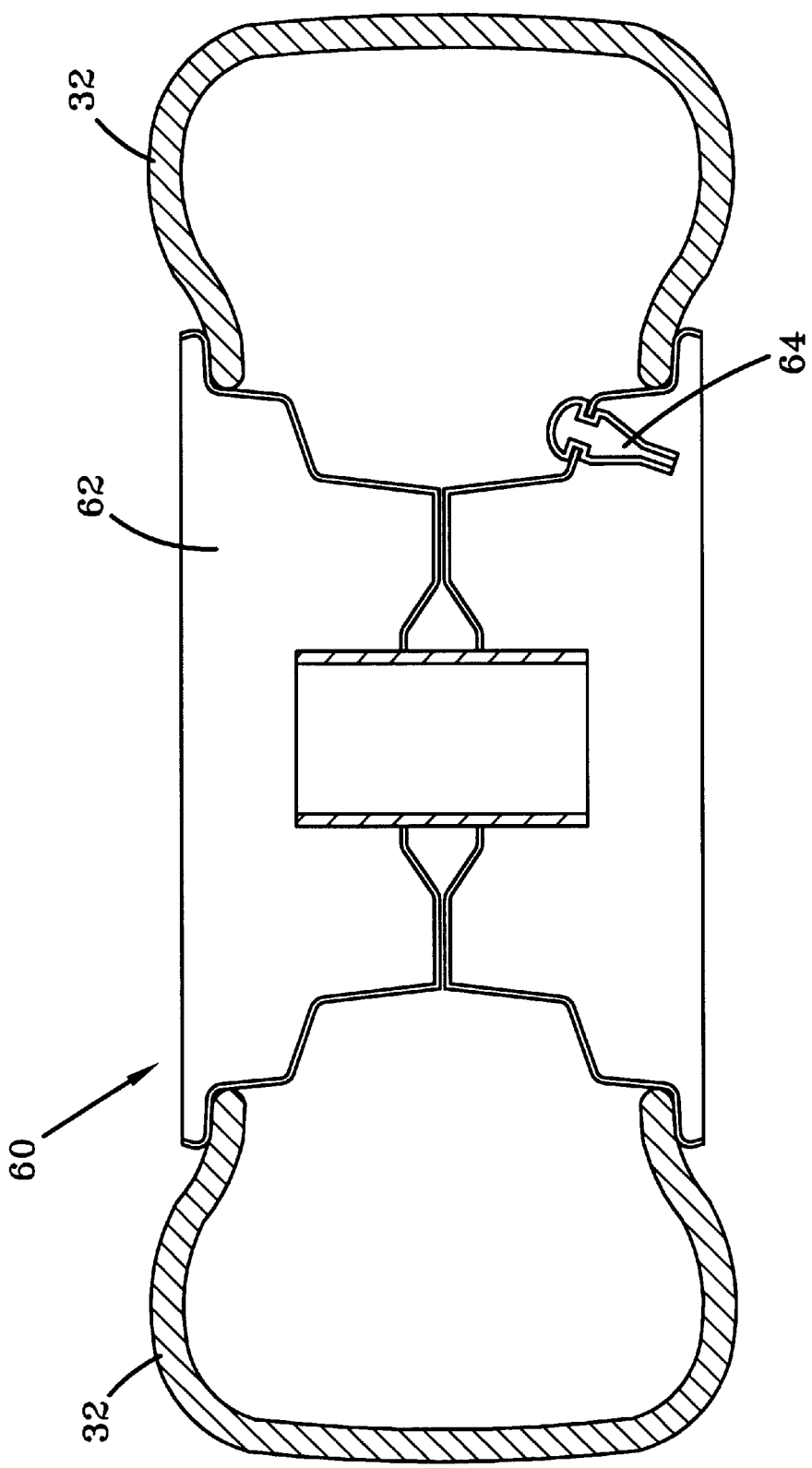
FIG. 11 is a perspective view of the tire assembly showing the tire attached to the tire rim and the valve stem.
Figure 12:
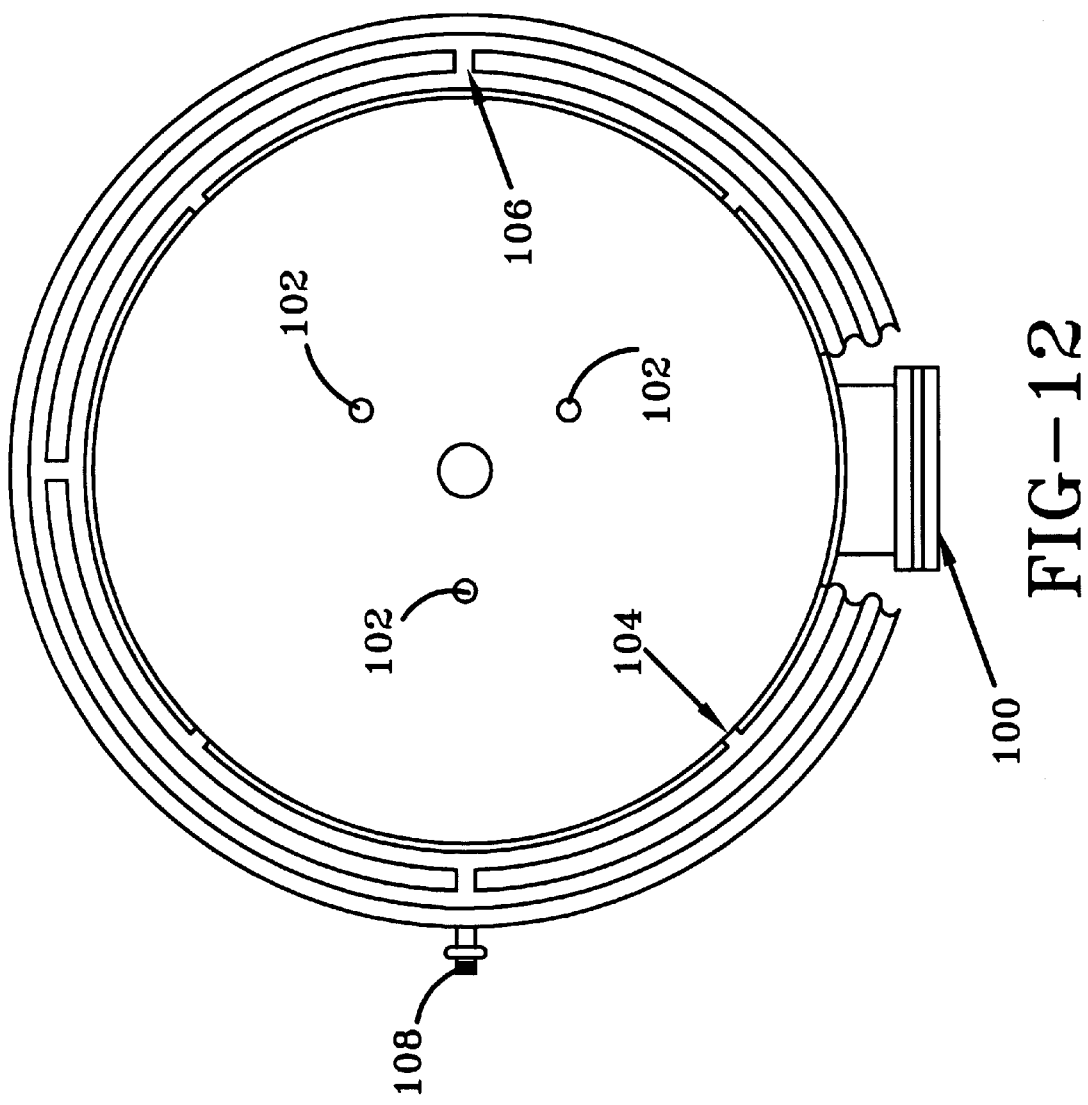
FIG. 12 is perspective view of the vacuum chamber showing the guard vacuum port, the inner vent slot, the center vent slot, a high vacuum and test port and fixture mounting holes.
Figure 13:
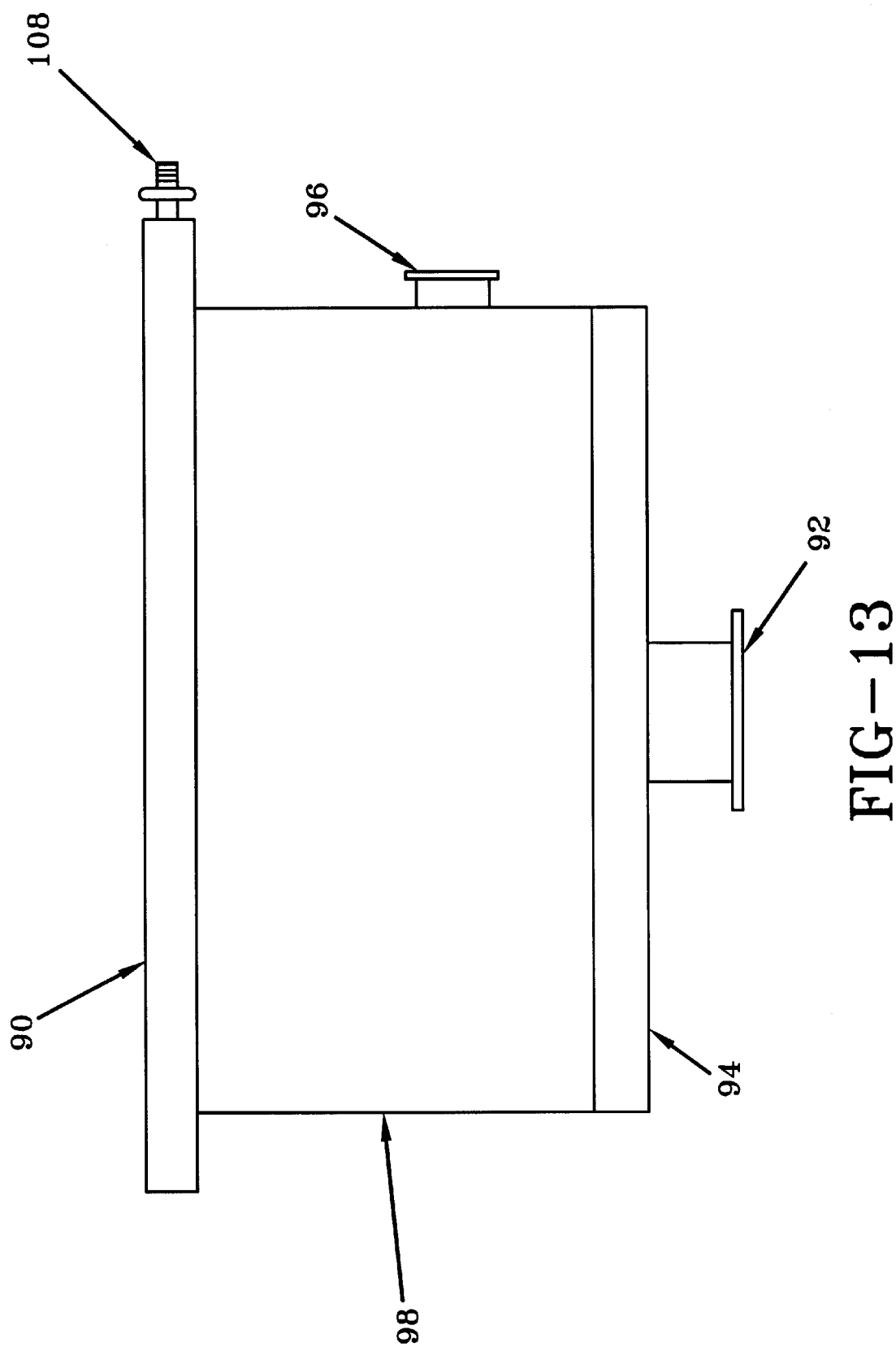
FIG. 13 is a perspective view of the first chamber showing the o-ring flange, guard vacuum port, a roughing and vent port, and gauge port.
Figure 14:
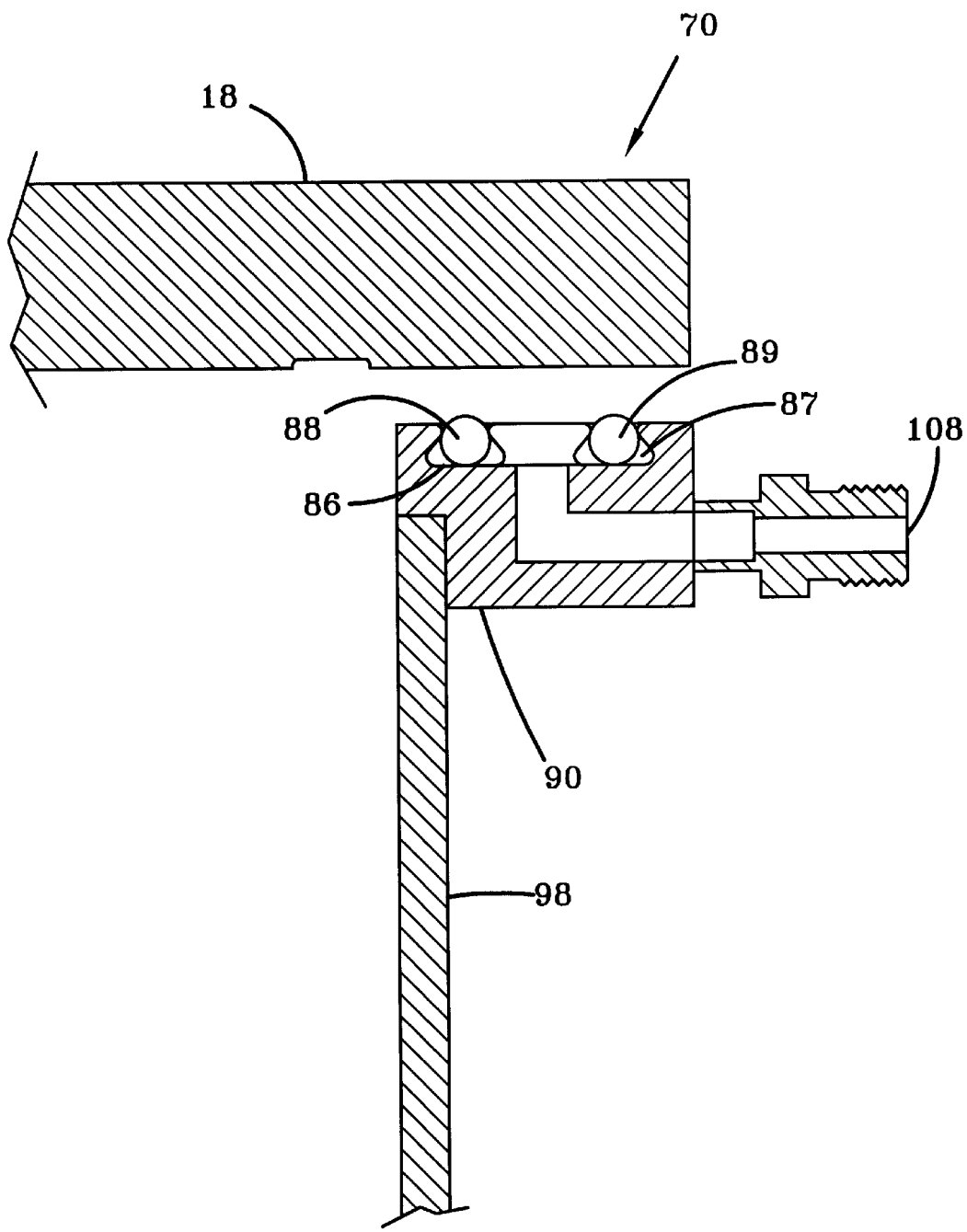
FIG. 14 is a cross-sectional view of a guard vacuum port, showing the o-rings, the first chamber top, and two dovetail o-ring grooves; and, FIG. 15 is a cross-sectional view of an ISO-K flange system.
Figure 15:
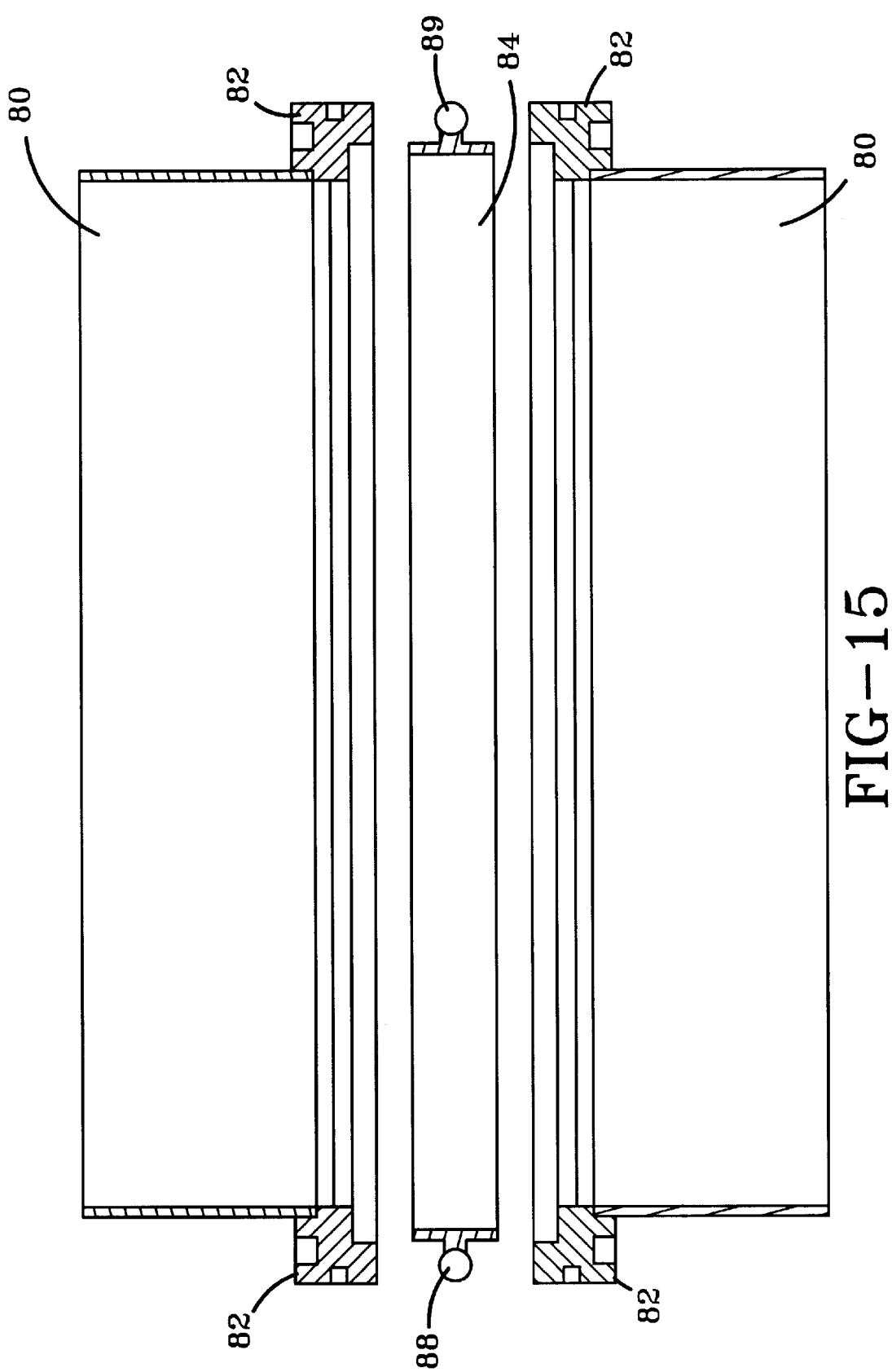

With reference to FIG. 7, a typical manufacturing layout for the inventive process is shown. FIG. 7 shows where the tires 32 are unloaded from the truck (not shown). The tires 32 are placed on a third conveyor (not shown), and go through oven 74. The oven 74 is heated to between 150° F. and 220° F., depending on the condition of the tire 32, then the tires 32 are heated for 10 minutes causing the tires 32 to expand. The tires 32 have been compressed due to the bundling process on the truck. The tires 32 pass out of the oven 74 and on to a first conveyor 72. The tire 32 proceeds down first conveyor 72 to the tire inflater assembly 58. Three photo switches (not shown) measure the width of the rim 62 to determine which tire rim 62 is being used. The photo switches (not shown) send the information to two rollers (not shown) which adjust to the position of the rim 62. A puck (not shown) is placed on top of the rim 62, prior to the tire 32 being fitted on the rim 62, to prevent the sharp edges from cutting the tire bead 34. The tire bead area 34 is lubricated with soap and the tire 32 is placed over top of the rim 62. The two rollers (not shown) push down on the tire 32, such that the beads 34 are seeded into the tire 32. The tire 32 moves into a tire inflater assembly 58. A surge tank (not shown) is filled to 60 psi (pounds per square inch) with a mixture of air and 10% helium by volume. In the preferred embodiment, "commercial grade helium" is used. What is meant by the term "commercial grade helium" is helium that is 96–98% pure. The surge tank fills the tire 32 to 20 psi. After the tire 32 has been seeded onto the bead 34, a "pick and place" system (not shown) using a venturi pump (not shown), and suction cups (not shown) picks up the puck and recycles the puck (not shown) back to the operator 76 to be placed on another rim 62. The tire 32 then passes on to the second conveyor 78. The tire 32 is then picked up from the second conveyor 78 by a robotic arm 40. The robotic arm 40 picks up the tire assembly 60 with pinchers 42. The tire 32 is placed inside the first vacuum chamber 10 and the first vacuum chamber 10 is evacuated by roughing pump 14 and hi-vac pump 16. At a predetermined vacuum pressure, a helium gas spectrometer 30 is exposed to the first vacuum chamber 10 and measures the amount of helium leaking from the tire assembly 60. Based on this leak rate, the tire assembly 60 is then accepted and place on a third conveyor 44, or rejected and placed on a fourth conveyor 46.

In order to achieve the cycle time required, a first and second chamber 10, 12 are needed. The second chamber 12 is designed for use with large tires 32, while the first chamber 10 is dedicated to testing smaller tires 32. The cycle time of thirteen seconds is a measure of testing a single tire in one of the vacuum chambers 10, 12.

The vacuum chambers 10, 12 must be polished to a smooth surface finish in order to promote molecular flow and to minimize helium retention that results from a rough surface. The material must also resist corrosion in order to maintain the surface finish. For this reason, stainless steel is preferred.

As shown in FIGS. 1, 2, 12, 13, and 14 the first vacuum chamber 10 has an o-ring flange 90 welded around the chamber 10 to provide material for machining o-ring grooves 86, 87. Each chamber 10, 12 is equipped with a roughing and vent port 92, a high vacuum and test port 100, and a gauge port 96. The roughing and vent port 92 is a two-inch diameter port located at the bottom of the chamber 10. This port 92 is used for initial evacuation of the chamber 10 from atmospheric pressure, and for venting back to atmospheric pressure after the test is complete. The test port 100 is a four-inch diameter port located on the side of the chamber wall 98. This test port 100 is used for pumping from rough vacuum to the high level vacuum level required for leak testing. The gauge port 96 is a one-inch diameter port located on the side of the chamber wall 98. It is used to attach the pressure sensor 26 which monitors the pressure inside the chamber 10. The chamber 10 utilizes a double o-ring seal 70 with a guard vacuum (not shown), center and inner vent slots 106, 104, and vented threads (not shown). In order to perform effectively in the manufacturing environment, the top seal uses a constant deflection, double o-ring flange seal 70 with a guard vacuum (not shown). Two parallel dovetailed o-ring grooves 86, 87 are machined into the top surface of the flange 90. The dovetailed grooves 86, 87 retain two 0.275-inch wide o-rings 88, 89, preventing them from pulling out of the groove 86 when the chamber 10 is opened. The volume trapped between the two o-rings 88, 89 is connected to a guard vacuum pump (not shown) through a 0.25 inch diameter guard vacuum port 108 drilled into the side of o-ring flange 90. When the chamber 10 is closed and evacuated, the volume between the o-rings 88 is evacuated, producing an immediate guard vacuum. The guard vacuum provides a two-stage barrier between the chamber 10 and atmosphere. The seal produced by this system is much more effective and durable then a single o-ring seal, since each seal experiences only a portion of the pressure differential between the chamber vacuum and the atmosphere. The inner vent slot 104 allows air trapped by the inside o-ring 89 to be removed by the vacuum system. The center vent slot 106 connects the inner and outer o-ring grooves 87, 86. This creates a low volume, intermediate chamber between the test chamber 10 and the atmosphere, allowing the air trapped between the o-rings 88, 89 to be removed by the guard vacuum system. The tire 32 is then placed into the first vacuum chamber 10, and a first chamber top 18 is placed on top of the first vacuum chamber 10.

As shown in FIGS. 1, 2, 4, 12, and 13, the first chamber top 18 is lowered and seals against the o-ring flange 90.

When the chamber top 18 is in position, the vent valve (not shown) closes and the roughing valve (not shown) is opened, allowing the roughing pump 14 to begin evacuating the chamber 10. At the same time the roughing valve (not shown) is opened, the guard vacuum vent valve (not shown) is closed and the guard vacuum valve (not shown) is opened, allowing the system to evacuate the o-ring flange 90. As the chamber 10 is evacuated, the pressure sensor 26 monitors the pressure inside the chamber 10. A crossover pressure of 22 torr, a set point on the pressure sensor 26 signals the PLC (not shown) to close the roughing valve (not shown) and open the high vacuum valve (not shown). The hi-vac pump 16 then continues to evacuate the chamber 10 to a high vacuum level. At a crossover pressure of between 5.0–600 millitorr, a second set point signals the PLC (not shown) to open a test valve (not shown). The helium leak detector 30 is then exposed to the chamber 10 for 3 seconds, after which the test valve (not shown) closes and the helium leak rate signal is stored and compared to the reject level. As the test valve (not shown) is closed, the high vacuum valve (not shown) is also closed. When the high vacuum valve (not shown) is closed, the vent valve (not shown) opens allowing the chamber 10 to return to atmospheric pressure. As soon as the chamber 10 and vacuum guard (not shown) have been vented, the chamber top 18 is opened and the tire assembly 60 is removed. The use of the roughing pump 14, in concert with the hi-vac pump 16, to obtain the 5.0 millitorrs to 600 millitorrs, is a preferred embodiment of this invention, and is not intended to limit the invention in any way. Any method for creating a vacuum chosen in accordance with sound engineering judgment may be used. The level 5.0 millitorrs to 600 millitorrs is a preferred pressure for this invention, but any acceptable level of vacuum pressure could be used as long as it is below the maximum inlet pressure for the spectrometer 30 being used. This cycle lasts for 13 seconds. Once the cycle is finished, the robotic arm 40 removes the tire 32 from the vacuum chamber 10. If the tire 32 has been rejected, the tire 32 is placed on the second conveyor 46. However, if the tire 32 does not have a leak in it, the robotic arm 40 places the tire 32 on the first conveyor 44. All references to first chamber 10 are also applicable to second vacuum chamber 12.

The use of the helium leak detection is a preferred embodiment of this invention, but any means for leak detection may be used. The helium leak detection is used because it is the most sensitive of the leak detection methods. The robotic arm 40 is also a preferred embodiment of this invention, and any means for lifting tires 32 from the second conveyor 78 may be used.

The invention has been described with reference to a preferred embodiment. Obviously, modifications and alterations will occur to others upon a reading and understanding of the specification. It is intended by applicant to include all such modifications and alterations in so far as they come within the scope of the appended claims or the equivalents thereof.

We claim:

1. A tire testing method for detecting leaks in associated tires, the tire testing method comprising the steps of:

providing a tire inflator assembly, said tire inflator assembly comprising at least two rigid vacuum chambers having two different fixed volumes for holding different sized tires, a leak detector, and a robotic arm;

heating the associated tire;

using said tire inflator assembly to inflate the associated tire with a mixture of helium air, the mixture being 90% air and 10% commercial grade helium by volume;

placing the associated tire into a vacuum chamber with said robotic arm, said robotic arm having pincer-like extensions;

sealing the vacuum chamber with a chamber top;

evacuating the air from the vacuum chamber down to less than 50 torr with a roughing pump;

evacuating the air from the vacuum chamber down to 5.0 to 600 millitorr with a hi-vac pump;

detecting the amount of helium that leaked into the vacuum chamber from the associated tire using a spectrometer; and, sorting the tire into a first or second area depending on whether or not the tire leaks, wherein the steps of placing the associated tire into a vacuum chamber with said robotic arm to the step of detecting the amount of helium that leaked into the vacuum chamber from the associated tire using a spectrometer has a cycle time of approximately thirteen seconds.

2. The method of claim 1, wherein the step of heating the associated tire further comprises the step of:

heating the associated tire to approximately between 150° F. and 220° F., Fahrenheit.

3. The method of claim 1, wherein sealing the vacuum chamber with a chamber top further comprises the step of sealing the vacuum chamber with a double o-ring seal.

4. The method of claim 1, wherein the first and second areas for sorting the tires are first and second conveyor belts, respectively.

5. An apparatus for detecting leaks in an associated pneumatic tire, the apparatus comprising:

at least two rigid vacuum chambers having two different fixed volumes for holding different sized tires, said at least two vacuum chambers providing a cycle time of approximately thirteen seconds for detecting leaks;

a leak detector;

a double o-ring seal for sealing the vacuum chambers and, a robotic arm.

6. The apparatus of claim 5, further comprising a chamber top adapted to operatively connect to one of said vacuum chambers.

7. The apparatus of claim 5, wherein at least one of said vacuum chambers comprises a roughing and vent port located at a bottom of said vacuum chamber, said roughing and vent port adapted to be used during initial evacuation of said vacuum chamber from atmospheric pressure and for venting back to atmospheric pressure after an associated test is complete.

8. The apparatus of claim 7, wherein said at least one vacuum chamber further comprises a test port located on a side of a chamber wall of said vacuum chamber, said test port adapted to be used for pumping from a rough vacuum to a high level vacuum level required for leak testing.

9. The apparatus of claim 8, wherein said at least one vacuum chamber further comprises a gauge port located on said side of said chamber wall, said gauge port adapted to attach to a pressure sensor to monitor the pressure inside said vacuum chamber.

* * * * *